(12) United States Patent
Floyd, III et al.

(10) Patent No.: US 9,259,725 B2
(45) Date of Patent: Feb. 16, 2016

(54) ACYCLIC AZA-CONTAINING LIGANDS FOR USE AS CATALYTIC CARBON CAPTURE SYSTEMS

(71) Applicant: Lawrence Livermore National Security, LLC, Livermore, CA (US)

(72) Inventors: William C. Floyd, III, Oakland, CA (US); Carlos A. Valdez, San Ramon, CA (US); Roger Aines, Livermore, CA (US); Sarah Baker, Dublin, CA (US); Joe H. Satcher, Jr., Patterson, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 217 days.

(21) Appl. No.: 14/051,380

(22) Filed: Oct. 10, 2013

(65) Prior Publication Data

US 2015/0104367 A1    Apr. 16, 2015

(51) Int. Cl.
*B01D 53/62* (2006.01)
*B01J 31/22* (2006.01)
*C01B 33/12* (2006.01)

(52) U.S. Cl.
CPC ............ *B01J 31/22* (2013.01); *B01D 53/62* (2013.01); *C01B 33/126* (2013.01); *B01D 2252/103* (2013.01); *B01D 2252/602* (2013.01); *B01D 2255/20792* (2013.01); *B01D 2255/705* (2013.01); *B01D 2257/504* (2013.01)

(58) Field of Classification Search
CPC ............ B01D 53/62; B01D 2255/20792; B01D 2255/20761; B01D 2255/20746; B01D 2255/20753; B01D 2257/504; B01J 31/0235; B01J 31/1805; C01B 33/00
See application file for complete search history.

(56) References Cited

U.S. PATENT DOCUMENTS

| | | | | |
|---|---|---|---|---|
| 5,102,456 | A * | 4/1992 | Jagannathan et al. | 106/1.26 |
| 7,186,400 | B2 * | 3/2007 | Giovenzana et al. | 424/9.36 |
| 2006/0034773 | A1 * | 2/2006 | Giovenzana et al. | 424/9.361 |

OTHER PUBLICATIONS

Kimura et al., "Phosphodiester Hydrolysis by a New Zinc(II) Macrocyclic Tetraamine Complex with an Alcohol Pendant: Elucidation of the Roles of Ser-102 and Zinc(II) in Alkaline Phosphatase," 1995 American Chemical Society, Journal of American Chemical Society, vol. 117, 1995, pp. 8304-8311.

Zhang et al., "A Functional Model for Carbonic Anhydrase: Thermodynamic and Kinetic Study of a Tetraazacyclododecane Complex of Zinc(II)," 1995 American Chemical Society, Inorganic Chemistry, vol. 34, 1995, pp. 5606-5614.

Christianson et al., "Catalysis by Metal-Activated Hydroxide in Zinc and Manganese Metalloenzymes," 1999 Annual Reviews, Annual Reviews Biochemistry, vol. 68, 1999, pp. 33-57.

"Carboxy and Diphospate Ester Hydrolysis Promoted by Dinuclear Zinc(II) Macrocyclic Complexes. Role of Zn(II)-Bound Hydroxide as the Nucleophilic Function," 1999 American Chemical Society, pp. 1-14.

Diebold et al., "Crystal Structures and Solution Behavior of Paramagnetic Divalent Transition Metal Complexes (Fe, Co) of the Sterically Encumbered Tridentate Macrocycles 1,4,7-R3-1,4,7-Triazacyclononane: Coordination Nos. 5 (R=i-Pr) and 6 (R=i-Bu)," 2000 American Chemical Society, Inorganic Chemistry, vol. 39, 2000, pp. 3915-3923.

(Continued)

*Primary Examiner* — Timothy Vanoy
(74) *Attorney, Agent, or Firm* — Zilka Kotab

(57) ABSTRACT

According to one embodiment, a catalyst includes a metal ion, and an acyclic ligand having at least one aza-containing moiety, where the ligand is complexed to the metal ion.

20 Claims, 12 Drawing Sheets

(56) References Cited

OTHER PUBLICATIONS

Subat et al., "1,4,7,10-Tetraazacyclododecane Metal Complexes as Potent Promoters of Carboxyester Hydrolysis under Physiological Conditions," 2007 American Chemical Society, Inorganic Chemistry, vol. 46, No. 10, 2007, pp. 4336-4356.

Puxty et al., "Carbon Dioxide Postcombustion Capture: A Novel Screening Study of the Carbon Dioxide Absorption Performance of 76 Amines," 2009 American Chemical Society, Environmental Science & Technology, vol. 43, No. 16, 2009, pp. 6427-6433.

Ehrlich et al., "Modern Views on Desilicification: Biosilica and Abiotic Silica Dissolution in Natural and Artificial Environments," 2010 American Chemical Society, Chemical Review, vol. 110, 2010, pp. 4656-4689.

Montzka et al., "Non-CO2 greenhouse gases and climate change," 2011 Macmillan Publishers Limited, Nature, vol. 476, Aug. 4, 2011, pp. 43-50.

Bhown et al., "Analysis and Status of Post-Combustion Carbon Dioxide Capture Technologies," 2011 American Chemical Society, Environmental Science & Technology, vol. 45, 2011, pp. 8624-8632.

Koziol et al., "Toward a Small Molecule, Biomimetic Carbonic Anhydrase Model: Theoretical and Experimental Investigations of a Panel of Zinc(II) Aza-Macrocyclic Catalysts," 2012 American Chemical Society, Inorganic Chemistry, vol. 51, 2012, pp. 6803-6812.

Norman, Paul R., "Enhanced Hydrolysis of Neutral Phosphate Esters by the Zinc(II) Complex of 1,4,7,10-Tetraazacyclododecane," Inorganica Chimica Acta, vol. 130, 1987, pp. 1-4.

Koike et al., "Roles of Zinc(II) Ion in Phosphatases. A Model Study with Zinc(II)-Macrocyclic Polyamine Complexes," 1991 American Chemical Society, Journal of American Chemistry, vol. 113, 1991, pp. 8935-8941.

Schröder, et al., "Silicateins, silicase and spicule-associated proteins: synthesis of demosponge silica skeleton and nanobiotechnological applications," Porifera Research: Biodiversity, Innovation and Sustainability, 2007, pp. 581-592.

\* cited by examiner

ACYCLIC AZA-CONTAINING LIGANDS FOR USE AS CATALYTIC CARBON CAPTURE SYSTEMS

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to catalysts for the capture and hydration of carbon dioxide from aqueous mixtures and/or the atmosphere, and more particularly to a coordination complex including a metal ion and acyclic aza-containing ligands such as bis-pyrrolidinyl and bis-imidazoyl alkyldiamines, and methods of making the same.

BACKGROUND

Given the harmful consequences of global warming effects, there exists a current drive to develop carbon capture systems with the goal of reducing carbon dioxide ($CO_2$) levels discharged into the atmosphere and the environment. A typical carbon dioxide capture/hydration method involves the absorption of generated $CO_2$ into basic, aqueous solutions. The role of the base in the medium may be fulfilled by an organic amine base such as monoethanolamine (MEA). While efficient, this typical methodology contains inherently strong drawbacks that raise concern about its implementation in large scale productions. For instance, the basic solutions are expensive to use and regenerate, as the regeneration process often employs temperatures exceeding 100° C. to liberate the captured $CO_2$. Additionally, the cost to a coal powered plant for driving this energy intensive process is about 20-30% of the total energy produced by the plant, which may translate into a substantial increase in energy cost for consumers.

A known, alternate approach to the use of basic solutions for $CO_2$ capture is the employment of carbonate solutions. Unfortunately, the rate of absorption of $CO_2$ by carbonate-based solution is orders of magnitude slower than their amine-based counterparts. However, the rate of $CO_2$ absorption may be enhanced via the addition of catalysts such as carbonic anhydrase (CA). Carbonic anhydrase is an enzyme that catalyzes the conversion of $CO_2$ into bicarbonate according to equation (1) below. The turnover rate for CA is about $10^6$ mol$^{-1}$ s$^{-1}$, making it one of the fastest enzymes in biological systems.

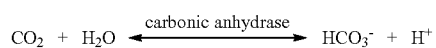

(1)

Although the use of CA may result in an overall enhancement and improvement of the carbon capture process, the enzyme's function is greatly limited by the pH of the solution as well as the temperature of the environment. These are two issues that typically plague any process utilizing an enzyme as its main functional unit. Moreover, enzymes, in general, are also sensitive to highly saline or alkaline environments, where both denaturation and peptide hydrolysis may occur. For these reasons other viable systems are often sought for replacement.

Accordingly, zinc (II) cyclen (reproduced below), another active small molecule catalyst, is currently utilized in carbon capture systems, as it is capable of carrying out the hydration of $CO_2$ in a manner similar to CA.

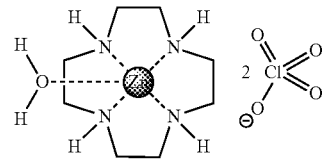

This small molecule mimic possesses characteristics that make it a superior candidate for use in industrial applications, such as its ability to withstand temperatures up to 120° C. and still retail catalytic activity upon cooling of the solution. However, while $Zn^{2+}$ cyclen catalyzes the hydration of $CO_2$ with a rate constant of about $10^3$ mol$^{-1}$ s$^{-1}$, its catalytic profile still does not equal that of CA.

SUMMARY

According to one embodiment, a catalyst includes a metal ion, and an acyclic ligand having at least one aza-containing moiety, where the ligand is complexed to the metal ion.

Other aspects and embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, reference should be made to the following detailed description read in conjunction with the accompanying drawings.

DETAILED DESCRIPTION

Figure 1:
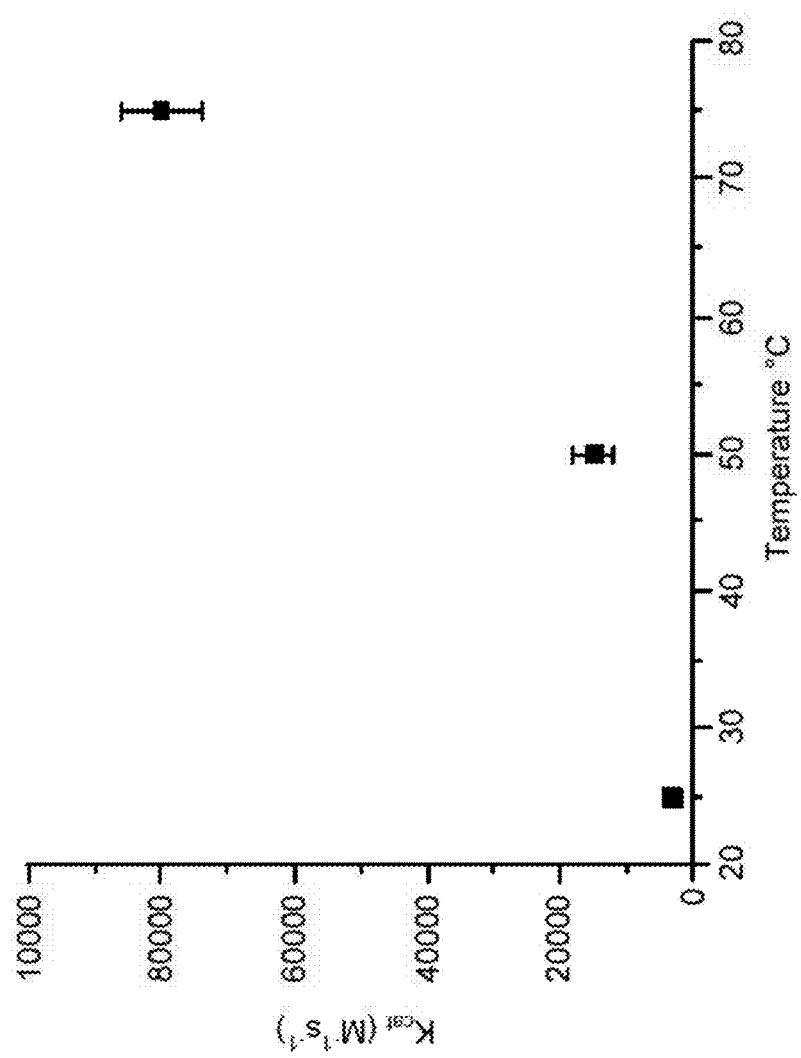
FIG. 1 shows a plot of the catalytic activity of $Zn^{2+}$ cyclen for catalyzing the conversion of $CO_2$ into bicarbonate at 25° C., 50° C. and 75° C.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In addition, as used herein, the term "about" when combined with a value refers to plus and minus 10% of the reference value. For example, a temperature of about of about 50° C. refers to a temperature of 50° C.±5° C., etc.

The following description discloses several preferred embodiments of a catalyst for use in carbon capture and carbon dioxide catalytic hydration and/or related systems and methods.

In one general embodiment, a catalyst includes a metal ion, and an acyclic ligand having at least one aza-containing moiety, where the ligand is complexed to the metal ion.

Catalysts work by lowering the activation energy of the targeted reaction without being consumed in the process. For example, as discussed above, catalysts may be used to increase the reaction rate of the $CO_2$ hydration reaction to yield water-soluble bicarbonate. A simplified version of this reaction is depicted below:

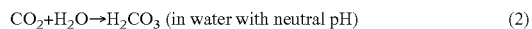

$$CO_2 + H_2O \rightarrow H_2CO_3 \text{ (in water with neutral pH)} \quad (2)$$

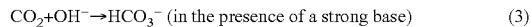

$$CO_2 + OH^- \rightarrow HCO_3^- \text{ (in the presence of a strong base)} \quad (3)$$

As illustrated in reaction (2), in water with an approximately neutral pH value, the catalyst will increase the conversion of $CO_2$ into carbonic acid ($H_2CO_3$). Moreover, as illustrated in reaction (3), in a basic solution, the catalyst will increase the reaction rate of converting $CO_2$ into bicarbonate ($HCO_3^-$).

Catalysts with metal active sites are typically well suited for carbon dioxide removal. The metal ion within the catalytic center is coordinated to a water molecule. Factors that generally play a role in the overall rate of $CO_2$ removal reactions using such catalysts may include the pKA values of the metal coordinated water molecule, the pH of the solution, the temperature of the solution, the catalyst's solubility in the medium of interest (e.g. with catalysts having optimal solubilities in the targeted fluids expected to perform better than those that have solubility issues), etc.

In a basic solution, such as the one that exists in most industrial environments, where the pKa of the selected "catalyst" is lower than the pH of the solution, the water molecule coordinated to the metal ion becomes a hydroxide as a result of deprotonation by the basic solvent. The residual coordinated hydroxide ion is electron rich and consequently nucleophilic. Further, its nucleophilicity is enhanced even further via its coordination to the metal center. In the presence of $CO_2$, the carbon atom in $CO_2$ undergoes a nucleophilic addition reaction by the hydroxide ion. The result, as depicted in reaction (3) above, is the formation of $HCO_3^-$. When the pH value of the solution equals the pKa of the water coordinated to the metal catalytic center, equilibrium may exist with 50% of the species existing as hydroxide coordinated to the metal center and the other 50% having the $H_2O$ molecule coordinated to the metal center. In these conditions a mixture of $H_2CO_3$ and $HCO_3^-$ may be formed.

One of the fastest enzyme known, carbonic anhydrase (CA), has a catalytic nucleus consisting of a metal active site ideal for carbon dioxide removal. The CA catalytic center includes a metal ion coordinated by three histidine residues and a water molecule, giving the zinc metal center a tetrahedral-like geometry. However, the use of CA in industrial settings has generally not been successful as it readily denatures in conditions typically present in industrial settings (e.g. high temperatures well above 37° C., high pressures and saturated salt concentrations, etc.).

$Zn^{2+}$ cyclen is another conventional catalyst useful in the carbon capture process, and possesses a greater stability (with regard to catalytic function in a variety of environmental/solution conditions) than carbonic anhydrase. While $Zn^{2+}$ cyclen catalyzes the hydration of $CO_2$ with a rate constant of about $10^3$ mol$^{-1}$ s$^{-1}$ to $10^4$ mol$^{-1}$ s$^{-1}$ in certain conditions, a rate much lower than the rate constant of $10^6$ mol$^{-1}$ s$^{-1}$ exhibited by CA, $Zn^{2+}$ cyclen's catalytic activity is not as sensitive and/or limited by the pH, salinity, alkalinity or temperature of the environment/solution. For example. $Zn^{2+}$ cyclen can withstand temperatures up to 120° C. and still retain its catalytic activity upon cooling of the solution. Moreover, $Zn^{2+}$ cyclen not only retains its catalytic activity at elevated temperatures, but the rate of $CO_2$ hydration may be enhanced to about $10^4$ mol$^{-1}$ s$^{-1}$, e.g. 80,000 mol$^{-1}$ s$^{-1}$ at 75° C., as shown in FIG. 1.

Figure 2A:
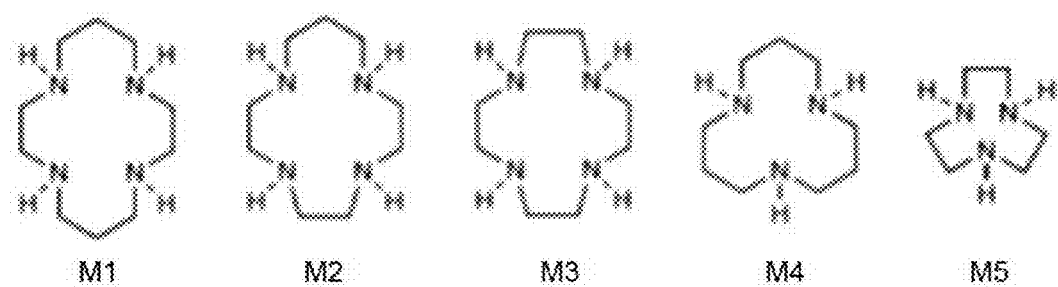
FIG. 2A shows exemplary $Z^{2+}$ coordinated azamacrocycle catalysts.
Figure 2B:
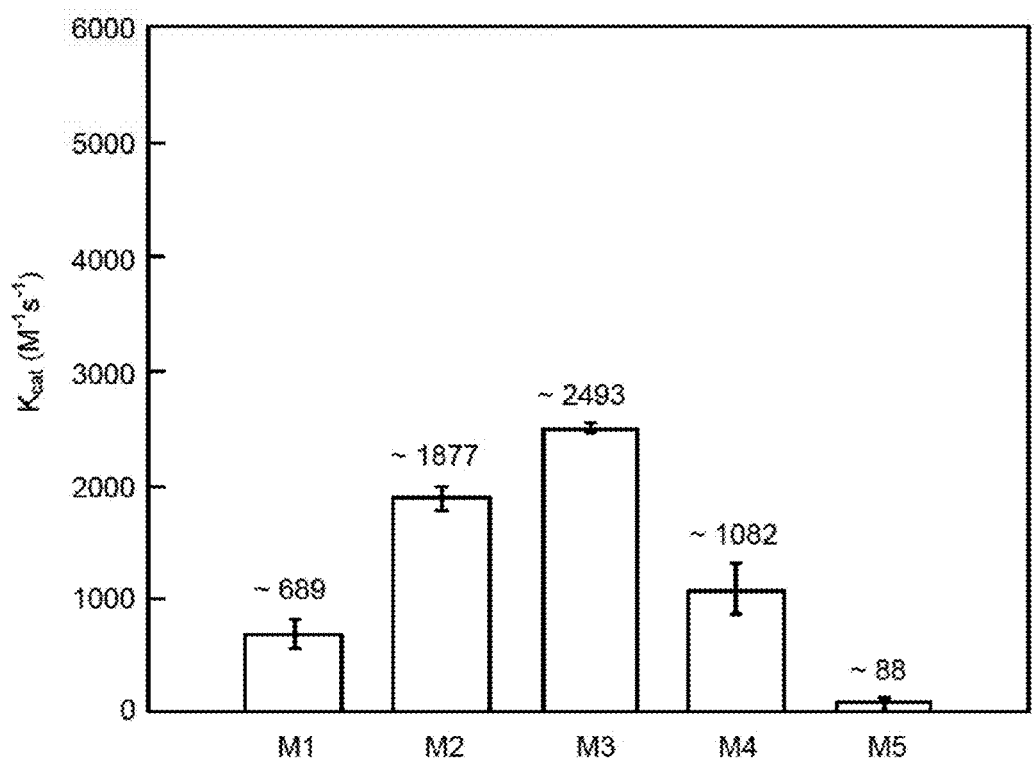
FIG. 2B shows a chart of the catalytic activity (measured using stopped-flow spectrophotometry) of the $Z^{2+}$ coordinated azamacrocycle catalysts described in FIG. 2A for catalyzing the conversion of $CO_2$ into bicarbonate at 25° C. and a pH of 9.0.

Other $Zn^{2+}$ coordinated azamacrocycles may also be used to catalyze the conversion of $CO_2$ into bicarbonate. FIG. 2A illustrates five such $Zn^{2+}$ coordinated azamacrocycles labeled M1 to M5, where M1 is also known as cyclam or 1,4,8,11-tetraazacyclotetradecane or [14]aneN4; M2 is a hybrid system (cyclen/cyclam) known as 1,4,7,10-tetraazacyclotridecane or [13]aneN4; M3 is known as $Zn^{2+}$ cyclen or 1,4,7,10-tetraazacyclododecane or [12]aneN4; M4 is a tri-aza analog known as 1,5,9-triazacyclododecane or [12]aneN3; and M5 is known as 1,4,7-triazacyclononane or [9]aneN3. However, as shown in FIG. 2B, compounds M1-M2 and M4-M5 exhibit lower catalytic activity as compared to $Zn^{2+}$ cyclen (M3).

Accordingly, various embodiments disclosed herein describe novel catalysts that may exhibit catalytic activity with regard to the hydrolysis of $CO_2$ comparable (e.g. about equal to) or greater than $Zn^{2+}$ cyclen. In addition, the novel catalysts disclosed herein exhibit a catalytic activity that, similar to $Zn^{2+}$ cyclen, may not be limited by and/or as sensitive to the pH, salinity, alkalinity or temperature of the environment/solution.

For example, in one embodiment, a catalyst may include a metal ion, and an acyclic ligand having at least one aza-containing moiety, where the ligand is complexed to the metal ion. For simplicity, this catalyst may be designated L-M, where L refers to the acyclic ligand and M refers to the metal ion.

In some approaches, the metal ion (M) may include, but is not limited to, a zinc ion, a copper ion, a cobalt ion, a nickel ion, etc. or other such suitable metal ion as would be understood by one having ordinary skill in the art upon reading the present disclosure. In other approaches, the metal ion (M) may be complexed to the acyclic ligand (L) as well as $OH^-$, $HCO_3^-$ or $H_2O$.

In more approaches, the acyclic ligand (L) may comprise a substituted or unsubstituted m-membered heterocyclic amine moiety, where in is from 3 to 6. In further approaches, the acyclic ligand may comprise a substituted or unsubstituted heteroaromatic amine moiety including, but not limited to, a pyrrole, a pyrroline, an imidazole, a methylated imidazole, an ethylated imidazole, a benzimidazole, a thiazole, a methylated thiazole, an ethylated thiazole, a benzothiazole, an oxazole, a methylated oxazole, an ethylated oxazole, a benzoxazole, a triazole, etc.

In further approaches, the catalyst L-M may exhibit a catalytic activity about equal to or greater than a zinc cyclen catalyst when used for the same purpose under otherwise identical environmental/solution/reaction conditions (pH, temperature, etc.). In even more approaches, the catalyst L-M may exhibit a catalytic activity of about 80,000 $mol^{-1}$ $s^{-1}$ for the conversion of $CO_2$ into carbonate at about 75° C.

Figure 3:
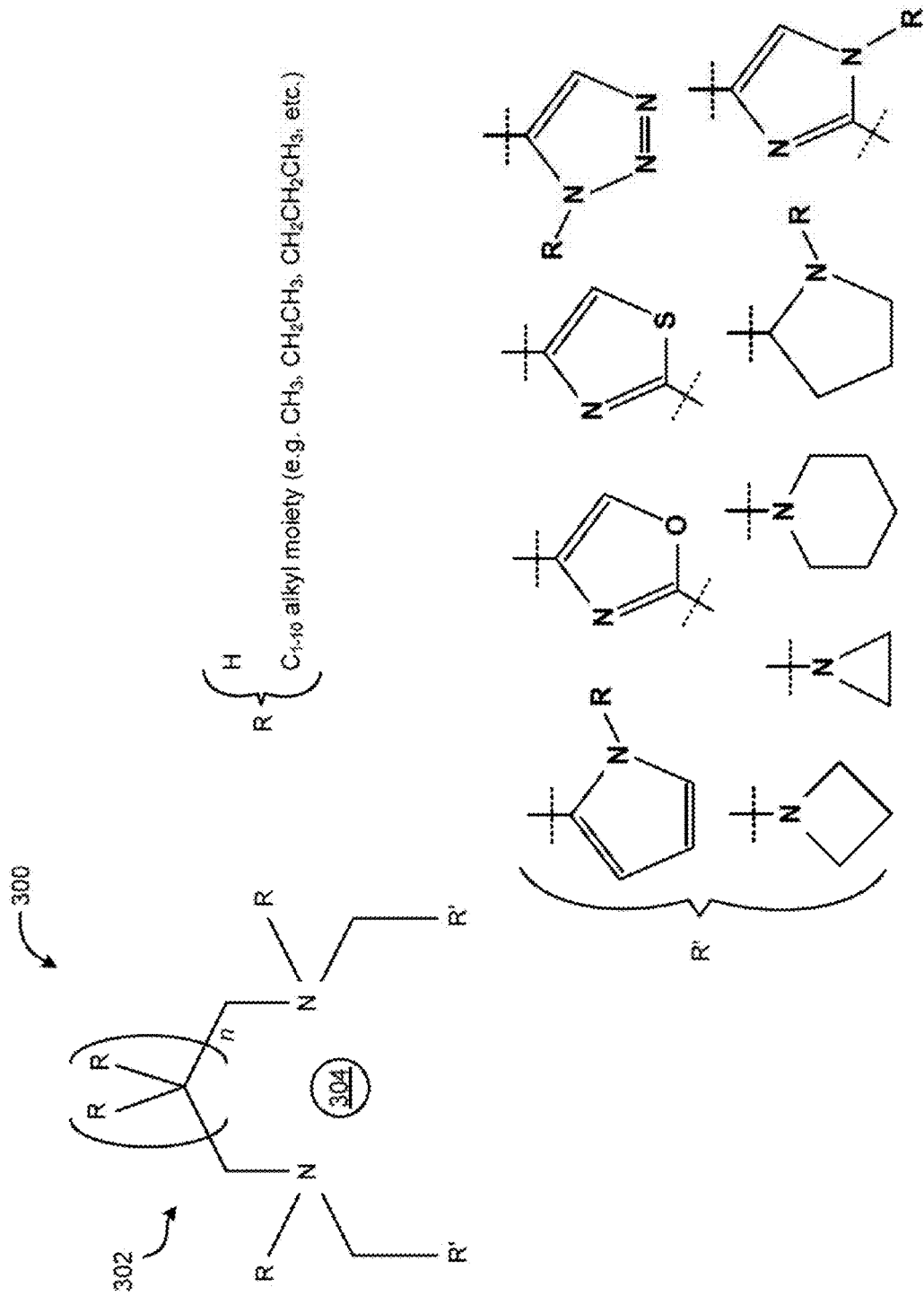
FIG. 3 shows a catalyst comprising a metal ion and an acyclic ligand, according to one embodiment.

Referring now to FIG. 3, a catalyst 300 comprising one or more acyclic ligands 302 and a metal ion 304 is shown according to one embodiment. As an option, the catalyst 300 may be implemented in conjunction with features from any other embodiment listed herein, such as those described with reference to the other FIGS. Of course, the catalyst 300 and others presented herein may be used in various applications and/or in permutations which may or may not be specifically described in the illustrative embodiments listed herein. Further, the catalyst 300 presented herein may be used in any desired environment.

As shown in FIG. 3, the acyclic ligand 302 may comprise at least one aza-containing moiety. As also shown in FIG. 3, the subscript n may range from 0 to 1. For example, in approaches where n equals 0, the acyclic ligand 302 may be represented by the formula:

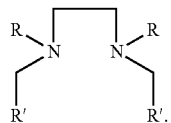

In other approaches where n equals 1, the acyclic ligand 302 may be represented by the formula,

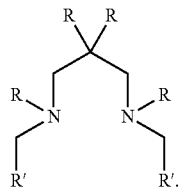

Each R group of the acyclic ligand 302 may independently comprise a hydrogen, a $C_{1-10}$ alkyl moiety, or other suitable moiety as would be understood by one having skill in the art. As used herein, "independently comprises" signifies that that each group so described (e.g. each of the R groups) may be the same or different. For instance, if there are four R groups (R1, R2, R3 and R4), all of the R groups may be the same, all of the R groups may be different, a subset of the R groups may be the same or different (e.g. R1 may be the same as R2, yet R1 (and thus R2) may be different from R3 and/or R4), etc.

In addition, each R' group of the acyclic ligand 302 may independently comprise a saturated or unsaturated heterocyclic moiety, where at least one of the R' groups comprises a saturated or unsaturated heterocyclic amine moiety. Again, it is important to note that both R' groups may be the same or different. For instance, in some approaches, at least one of the R' groups may be a saturated or unsaturated m-membered heterocyclic amine moiety, where in ranges from 3 to 6. In other approaches, at least one of the R' groups may be a substituted or unsubstituted heteroaromatic amine moiety including, but not limited to, a pyrrole, a pyrroline, an imidazole, a methylated imidazole, an ethylated imidazole, a benzimidazole, a thiazole, a methylated thiazole, an ethylated thiazole, a benzothiazole, an oxazole, a methylated oxazole, an ethylated oxazole, a benzoxazole, a triazole, etc.

Illustrative examples of suitable R and R' moieties for the acyclic ligand 302 are shown in FIG. 3. The R and R' groups, however, are in no way limited to the moieties presented in FIG. 3, but may also include other such suitable moieties as would be understood by one having ordinary skill in the art upon reading the present disclosure.

With continued reference to FIG. 3, a metal ion 304 may be coordinated to the one or more acyclic ligands 302. In one embodiment, the metal ion 304 may comprise a zinc ion (e.g. $Zn^{2+}$), a copper ion (e.g. $Cu^{2+}$), a nickel ion (e.g. $Ni^{2+}$), a cobalt ion (e.g. $Co^{2+}$), etc.

In some approaches, the metal ion 304 may also be coordinated to molecule or functional group (not shown in FIG. 3) including but not limited to $OH^-$, $H_2O$ or $HCO_3^-$.

According to one embodiment, the catalyst 300 may exhibit a catalytic activity about equal to or greater than a zinc cyclen catalyst used for the same purpose and under otherwise identical conditions. For example, where the catalyst 300 and zinc (II) cyclen are both used to catalyze the conversion of $CO_2$ into carbonate under identical environmental/solution/reaction conditions (e.g. pH, temperature, etc.), with the only difference being the identity of the catalyst, the catalyst 300 may exhibit a catalytic activity about equal to or greater than zinc (II) cyclen.

According to another embodiment, the catalyst 300 may exhibit a catalytic activity of about 80,000 $mol^{-1}$ $s^{-1}$ for the conversion of $CO_2$ into bicarbonate at about 75° C.

According to yet another embodiment, a method for capturing $CO_2$ may include contacting the catalyst 300 with a gas comprising $CO_2$ to at least partially remove $CO_2$ from the gas. In some approaches, this method may include contacting a solution, e.g. an aqueous solution, comprising the catalyst 300 to a gas comprising $CO_2$ in order to at least partially remove $CO_2$ from the gas. In other approaches, this method may include contacting a capsule, bead, porous receptacle, etc. comprising the catalyst 300 therein to a gas comprising $CO_2$ in order to at least partially remove $CO_2$ from the gas. In more approaches, after contacting the catalyst 300 with a gas comprising $CO_2$, the method may also include liberating the $CO_2$ via heating the catalyst.

Figure 4:
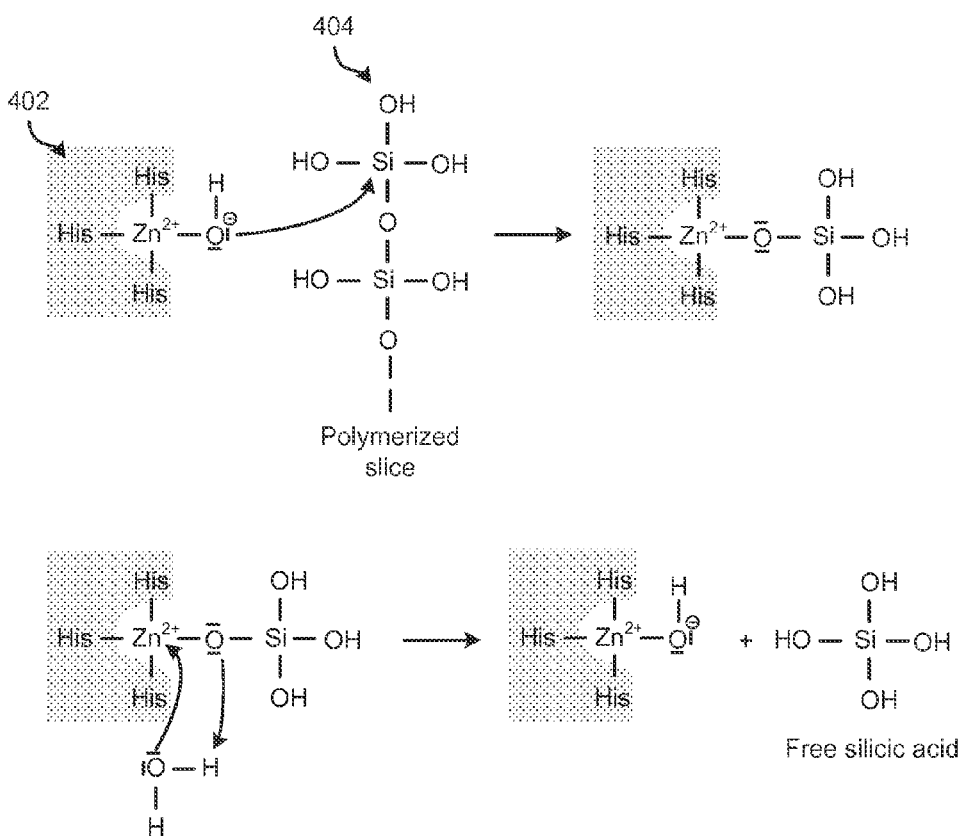
FIG. 4 shows the structure and mechanism of action in the active site of the silicase enzyme for the depolymerization of silica, according to the prior art.

According to further embodiments, the catalyst 300 may exhibit a high catalytic activity in the dissolution/depolymerization of amorphous silica. Without wishing to be bound by any theory, the high catalytic activity of the catalyst 300 in regards to the dissolution/depolymerization of amorphous silica may be due to the similarities between the carbonic anhydrase enzyme active site, of which the catalyst 300 may be a mimic, and the active site of conventional silicase enzymes used for the depolymerization of amorphous silica. For instance, as shown in FIG. 4, the silicase enzyme active site 402 also contains a hydrated zinc atom coordinated to three histidines, and carries out similar nucleophilic attacks on the polymerized silica 404.

According to additional embodiments, a method for hydrolyzing ester compounds, e.g. carboxy-esters, phosphor-esters, etc., may utilize the catalyst 300 of FIG. 3.

Figure 5:
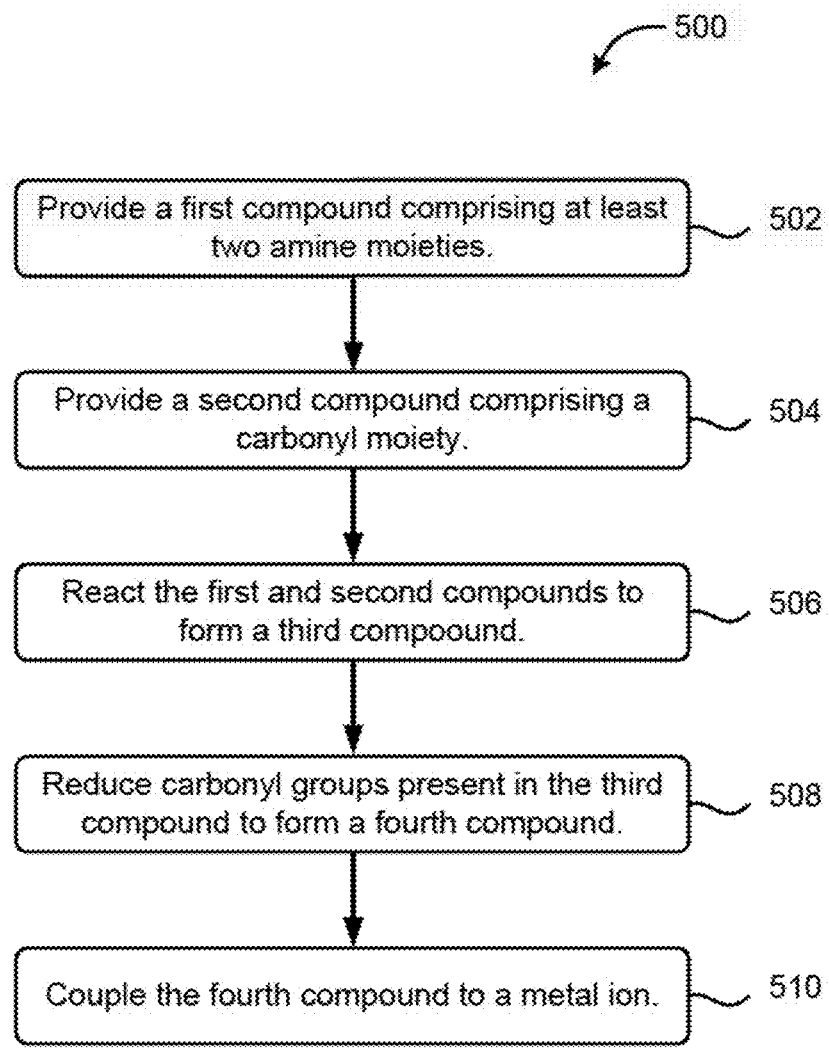
FIG. 5 shows a flowchart of a method for synthesizing a catalyst comprising a metal ion and an acyclic ligand, according to one embodiment.

Referring now to FIG. 5, an exemplary method 500 for forming a catalyst is shown, according to one embodiment. As an option, the present method 500 may be implemented in conjunction with features from any other embodiment listed herein, such as those described with reference to the other FIGS. Of course, however, such method 500 and others presented herein may be used in various applications and/or in permutations, which may or may not be specifically described in the illustrative embodiments listed herein. Moreover, more or less operations than those shown in FIG. 5 may be included in method 500, according to various embodiments.

As shown in FIG. 5, the method 500 includes providing a first compound comprising at least two amine moieties. See operation 502. In one approach, the first compound may have the formula:

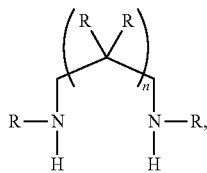

where n is zero or 1, and where R may independently comprise a hydrogen, a branched chain or straight chain $C_{1-10}$ alkyl moiety, or other such suitable moiety as would be understood by one having skill in the art upon reading the present disclosure.

With continued reference to FIG. 5, the method 500 also includes providing a second compound comprising a carbonyl moiety. See operation 504. In one approach, the second compound may have the formula:

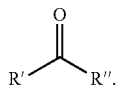

In some approaches, R' may comprise a substituted or unsubstituted saturated heterocyclic moiety, a substituted or unsubstituted unsaturated heterocyclic amine moiety, etc. In more approaches, R' may comprise a saturated or unsaturated m-membered heterocyclic amine moiety, where m ranges from 3 to 6. In other approaches, R' may comprise a substituted or substituted heteroaromatic amine moiety including but not limited to a pyrrole, a pyrroline, an imidazole, a methylated imidazole, an ethylated imidazole, a benzimidazole, a thiazole, a methylated thiazole, an ethylated thiazole, a benzothiazole, an oxazole, a methylated oxazole, an ethylated oxazole, a benzoxazole, a triazole, etc. Further, R'' may be a H or OH group in various approaches.

The method 500 additionally includes reacting the first and second compound to form a third compound. See operation 506. The third compound, in one approach, may have the formula

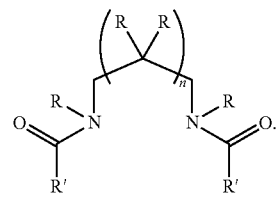

Further, the method 500 includes reducing one or more carbonyl groups present in the third compound to form a fourth compound, and coupling the fourth compound to a metal ion. See operations 508 and 510, respectively. In some approaches, the metal ion may be selected from a group consisting of $Zn^{2+}$, $Co^{2+}$, $Cu^{2+}$ and $Ni^{2+}$. In one embodiment, the resulting fourth compound coupled to the metal ion may have the structure of catalyst 300 illustrated in FIG. 3.

Any of the methods, systems, products, etc. described above, taken individually or in combination, in whole or in part, may be included in or used to make one or more products, processes, etc. In addition, any of the features presented herein may be combined in any combination to create various embodiments, any of which fall within the scope of the present invention.

ILLUSTRATIVE EXAMPLES

Synthesis of Bis-Pyrrolidinyl Alkyldiamines

Figure 6:
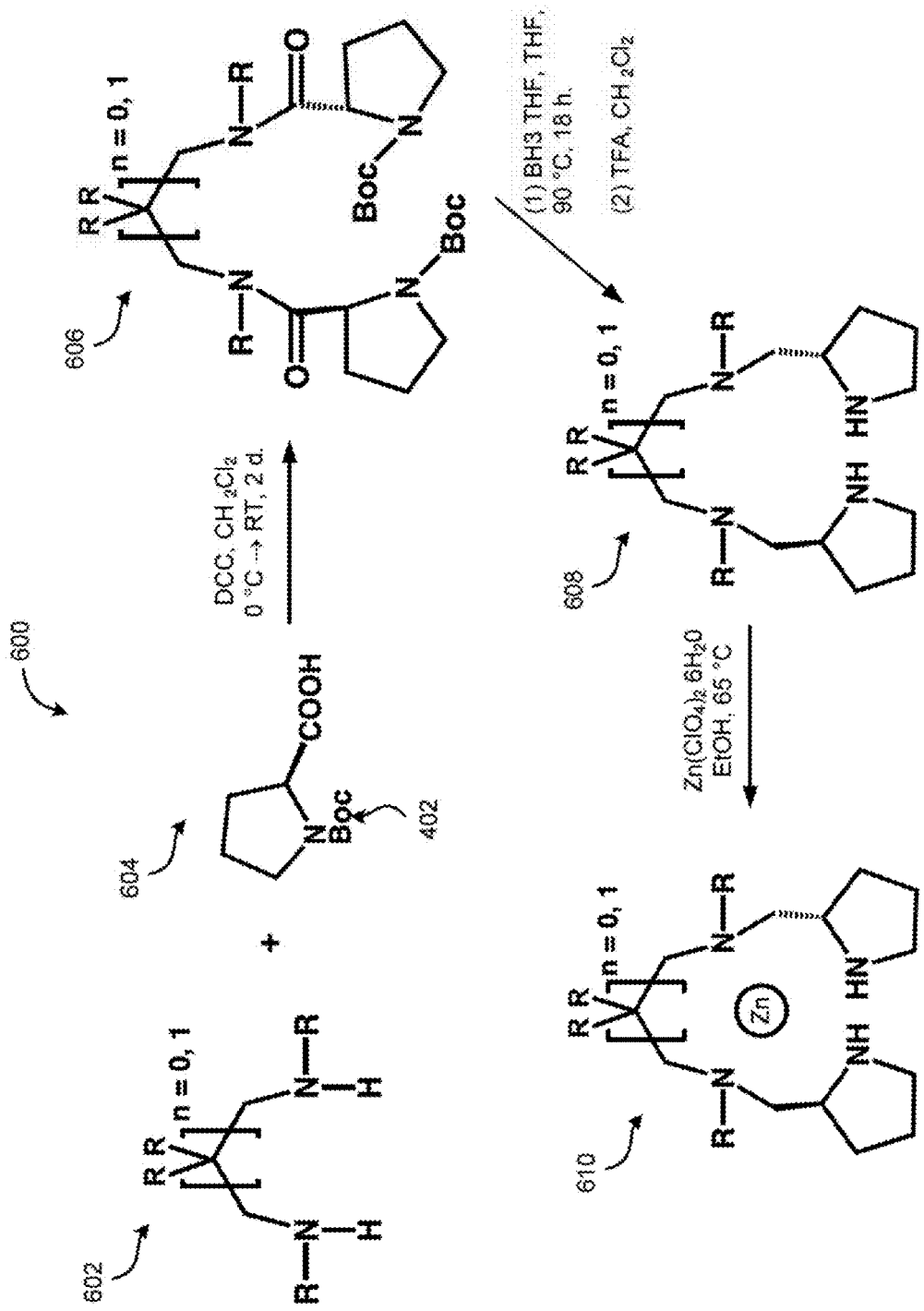
FIG. 6 shows a flowchart of a method for synthesizing a catalyst comprising a bis-pyrrolidinyl alklydiamine acyclic ligand and a metal ion, according to one embodiment.

An exemplary method 600 for synthesizing a catalyst comprising a bis-pyrrolidinyl alklydiamine acyclic ligand and a metal ion is illustrated in FIG. 6, according to one embodiment. As an option, the present method 600 may be implemented in conjunction with features from any other embodiment listed herein, such as those described with reference to the other FIGS. Of course, however, such method 600 and others presented herein may be used in various applications and/or in permutations, which may or may not be specifically described in the illustrative embodiments listed herein. Moreover, more or less operations than those shown in FIG. 6 may be included in method 600, according to various embodiments. Furthermore, while exemplary reaction techniques and/or reaction conditions are presented, other known reaction techniques and/or suitable reaction conditions may be used for various steps.

As shown in FIG. 6, the method 600 begins with the provision of an alkyldiamine 602 and a Boc-protected L-proline 604. With regard to the alkyldiamine 602, each R group may independently comprise a hydrogen, a branched chain $C_{1-10}$ alkyl moiety, a straight chain $C_{1-10}$ alkyl moiety, or other suitable moiety as would be understood by one having skill in the art.

The alkyldiamine 602 and the Boc-protected L-proline 604 may then be coupled via dicyclohexylcarbodiimide (DCC)-mediated coupling to form compound 606. Subsequently, a two-step process may be employed to furnish the ligand 608. This two-step process involves (1) amide reduction using $BH_3$.tetrahydrofuran (THF) in refluxing THF, and (2) trifluoroacetic acid (TFA)-mediated removal of the Boc groups present in compound 606. Alternatively, the amide reduction and removal of the Boc groups may be carried out without isolation of any intermediates by using the $BH_3$.THF reduction followed by refluxing in aqueous hydrochloric acid.

Synthesis of the final complex 610 may be accomplished by heating ligand 608 with $Zn(ClO_4)_2.6H_2O$ in ethanol. In other approaches, the ligand 608 may be heated with other different metal salts, such as a salt comprising Cu, Co or Ni, in order to form the complex 610 with a $Cu^{2+}$, $Co^{2+}$ or $Ni^{2+}$ or other suitable metal center.

In some approaches, the Boc-protected L-proline 604 starting material may be substituted by other heterocyclic-based carboxylic acids to yield ligands with similar properties as the catalytically active complex 610 and other such complexes/catalysts described herein. For example, a suitable heterocyclic-based carboxylic acid, other than the Boc-protected L-proline 604 starting material, may comprise an m-membered heterocyclic amine moiety, where m ranges from 3 to 6.

Synthesis of Bis-Imidazole Alkyldiamines

Figures 7A, 7B:
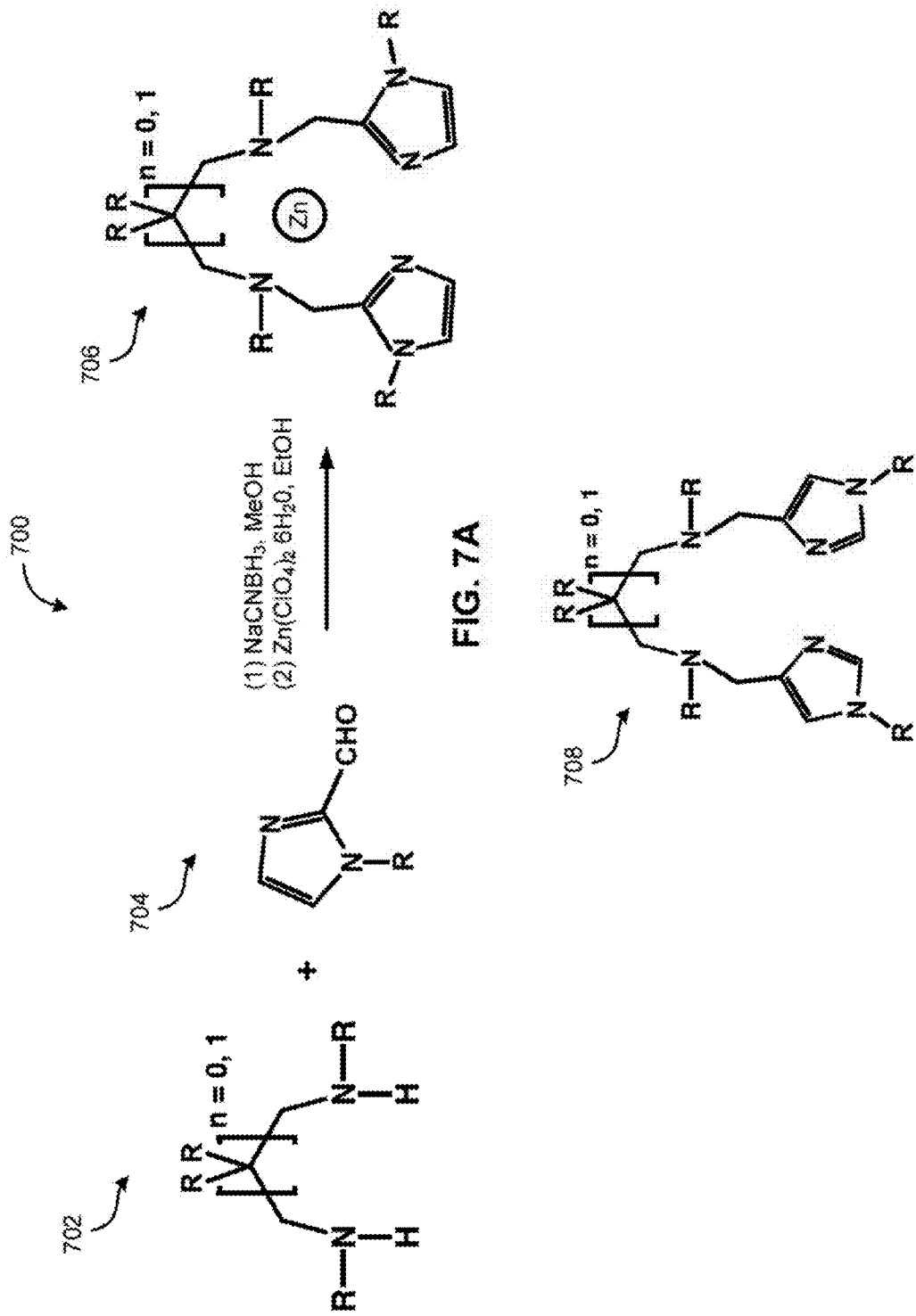
FIG. 7A shows schematic diagram of a method for synthesizing a catalyst comprising a bis-imidazole alklydiamine acyclic ligand and a metal ion, according to one embodiment.
FIGS. 7B to 7F show various embodiments of the catalyst produced from the method of FIG. 7A.

An exemplary method 700 for synthesizing a catalyst comprising a bis-imidazole alkydiamine acyclic ligand and a metal ion is illustrated in FIG. 7A according to one embodiment. As an option, the present method 700 may be implemented in conjunction with features from any other embodiment listed herein, such as those described with reference to the other FIGS. Of course, however, such method 700 and others presented herein may be used in various applications and/or in permutations, which may or may not be specifically described in the illustrative embodiments listed herein. Moreover, more or less operations than those shown in FIG. 7A may be included in method 700, according to various embodiments. Furthermore, while exemplary reaction techniques and/or reaction conditions are presented, other known reaction techniques and/or suitable reaction conditions may be used for various steps.

As shown in FIG. 7A, the method 700 begins with the provision of an alkyldiamine 702 and an imidazole carbaldehyde, such as N-methylimidazole 2-carbaldehyde 704. With regard to the alkyldiamine 702, each R group may independently comprise a hydrogen, a branched chain $C_{1-10}$ alkyl moiety, a straight chain $C_{1-10}$ alkyl moiety, or other suitable moiety as would be understood by one having skill in the art.

The method 700 next involves the condensation of the alkyldiamine 702 and N-methylimidazole 2-carbaldehyde 704 to form an intermediate imine compound (not shown). Subsequently, the method 700 involves reductive amination of the intermediate imine compound with a borohydride reagent ($NaBH_4$ or $NaCNBH_3$) to produce a bis-imidazole alkydiamine acyclic ligand (also not shown).

Synthesis of the final complex 706 may be accomplished by heating the ligand with $Zn(ClO_4)_2 \cdot 6H_2O$ in ethanol. In other approaches, the ligand may be heated with other different metal salts, such as a salt comprising Cu, Co or Ni, in order to form the complex 706 with a $Cu^{2+}$, $Co^{2+}$ or $Ni^{2+}$ or other suitable metal center.

In some approaches, the imidazole carbaldehyde (e.g. the N-methylimidazole 2-carbaldehyde 704) may be may be substituted by N-methylimidazole 4-carbaldehyde, such that an isomeric form 708 of the final complex 706 may be formed, as shown in FIG. 7B.

Figure 7C:
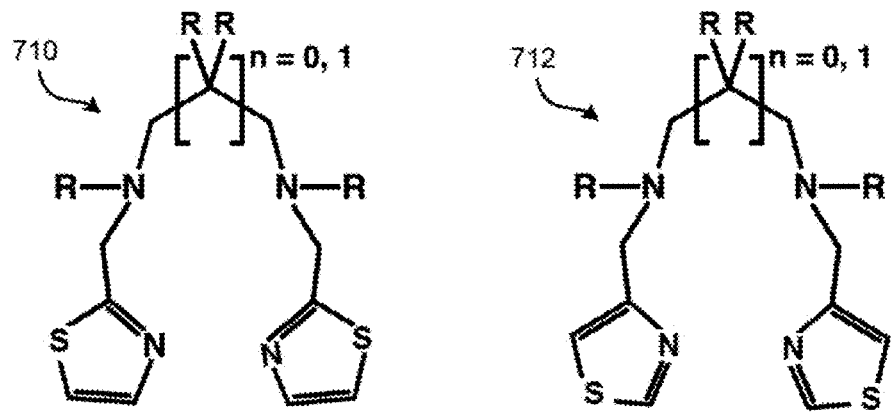
Figure 7D:
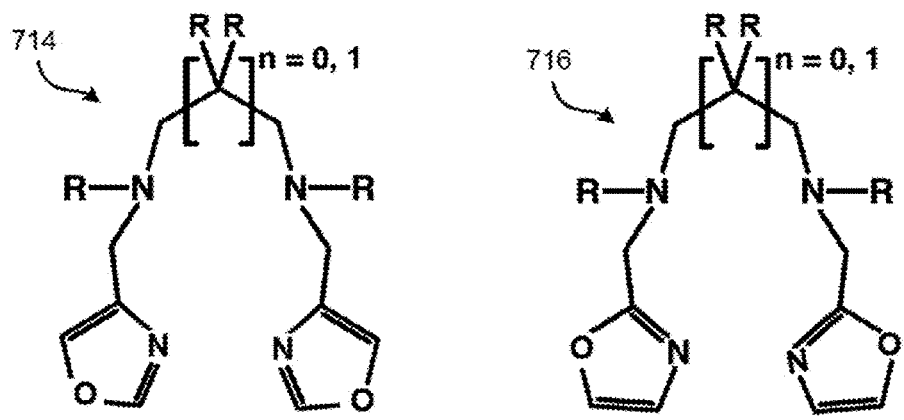
Figures 7E, 7F:
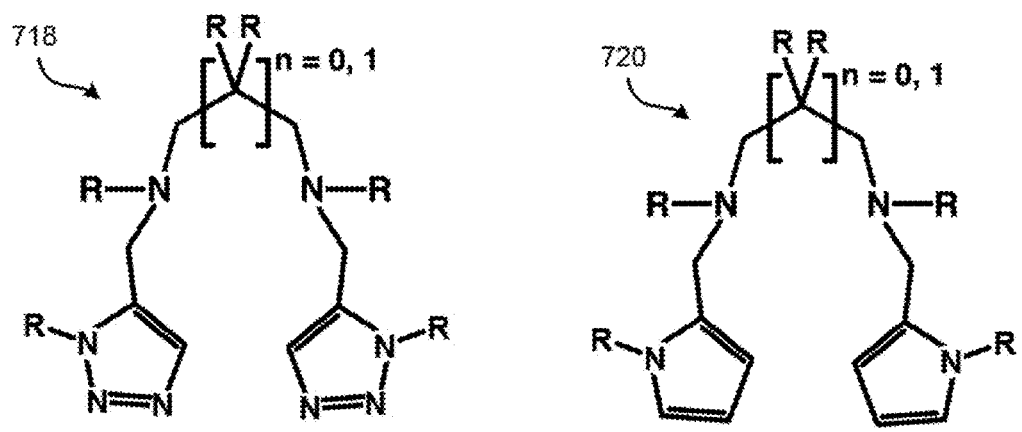

Moreover, in other approaches, other heteroaromatic-based aldehydes bearing a coordinating nitrogen center may be used in place of the imidazole starting material (e.g. the N-methylimidazole 2-carbaldehyde 704). For example, in one embodiment, a thiazole 2-carbaldehyde or its 5-carbaldehyde congener may be used in place of the imidazole starting material to produce complexes 710 and 712, respectively, as shown in FIG. 7C. In another embodiment, an oxazole starting material may be employed to yield complexes such as 714 and 716, as shown in FIG. 7D. In yet another embodiment, N-modified 1,2,3-triazole 4-carbaldehydes may be employed to furnish complexes comprising the structure of compound 718, as shown in FIG. 7E. In a further embodiment, a pyrrole starting material may be employed to yield complexes such as compound 720 shown in FIG. 7F.

In addition, further modifications of the carbon skeleton or the nitrogen atom of the ligands may be included as well in order to form more complex. For instance, in some approaches, use of substituted (e.g. methylated or ethylated) forms of the starting thiazole, imidazole or oxazole carbaldehyde starting materials may yield complexes/catalysts with similar properties as the catalytically active complexes/catalysts described herein. Moreover, benzene-containing analogs of the imidazole, thiazole or oxazole carbaldehyde starting materials, as well as their substituted analogs, such as benzimidazoles, benzothiazoles and benzoxazoles may also be used in even more approaches.

Stopped-Flow Rate Constant Determination

Experimental catalytic rate constants for the $CO_2$ hydration reaction were determined using stopped-flow spectrophotometry. All chemicals were purchased from Sigma-Aldrich and used as purchased. Prior to the experiment, a solution of $CO_2$ saturated water was prepared by sparging deionized water with 100% $CO_2$ gas at 25° C. for at least 30 min. Using Henry's constant, this solution was calculated to contain 33.8 mM $[CO_2]$. Generally, unless otherwise noted, a solution containing 0.2 M $NaClO_4$, 0.1 M AMPSO buffer, and $5 \times 10^{-5}$ M thymol blue indicator was evacuated under vacuum for 1 h followed by sparging with nitrogen for 20 min to remove dissolved $CO_2$. A baseline uncatalyzed rate was determined by rapidly mixing the dissolved $CO_2$ solution and an equal volume of the buffer solution in an Applied Photophysics stopped-flow spectrophotometer while recording the time-dependent absorbance at $\lambda = 596$ nm.

Solutions containing 1-2 mM $Zn^{2+}$ cyclen perchlorate were prepared by stirring under nitrogen. Initial rates for each catalyst concentration were calculated by fitting the first 10% of the time-dependent absorbance data with a single exponential decay function. Each catalyst and buffer solution was measured eight times, and the standard deviation determined. Initial rates were calculated using the equation $v_{init} = Q(A_0 - A_e)[d(\ln(A - A_e))/dt]t \rightarrow 0$ where Q is the buffer factor and $A_0$ and $A_e$ were the initial and final absorbance values, respectively. The value of Q was determined by mixing the buffer solution 1:1 with three different HCl/water solutions and measuring the resulting solution absorbance in the stopped flow spectrophotometer. The HCl concentrations measured were 0.0076, 0.0153, and 0.031 M, and were chosen to represent a range of $[H^+]$ similar to the $[H^+]$ generated in the $CO_2$ hydration reaction. The rate constant kcat was determined as the slope of $v_{init}/[CO_2]$ vs. [zinc cyclen $(ClO_4)_2$], and the error was determined as the standard deviation among replicates.

For the thermal stability experiments shown in FIG. 2B, 0.1 M catalyst was incubated in 1 M $K_2CO_3$ for the time period indicated, followed by dilution 1:100 in 0.1 M AMPSO buffer prior to measurement. For the bicarbonate titration experiments 0.25 M TAPS buffer with m-cresol purple pH indicator was acidified to pH 7.5 using $HClO_4$ prior to addition of KHCO3. Subsequently, the pH of the final solutions were adjusted to 8.25 using KOH. The buffer factor was measured for each KHCO3 concentration. The reaction progress was monitored at $\lambda = 578$ nm.

Figure 8:
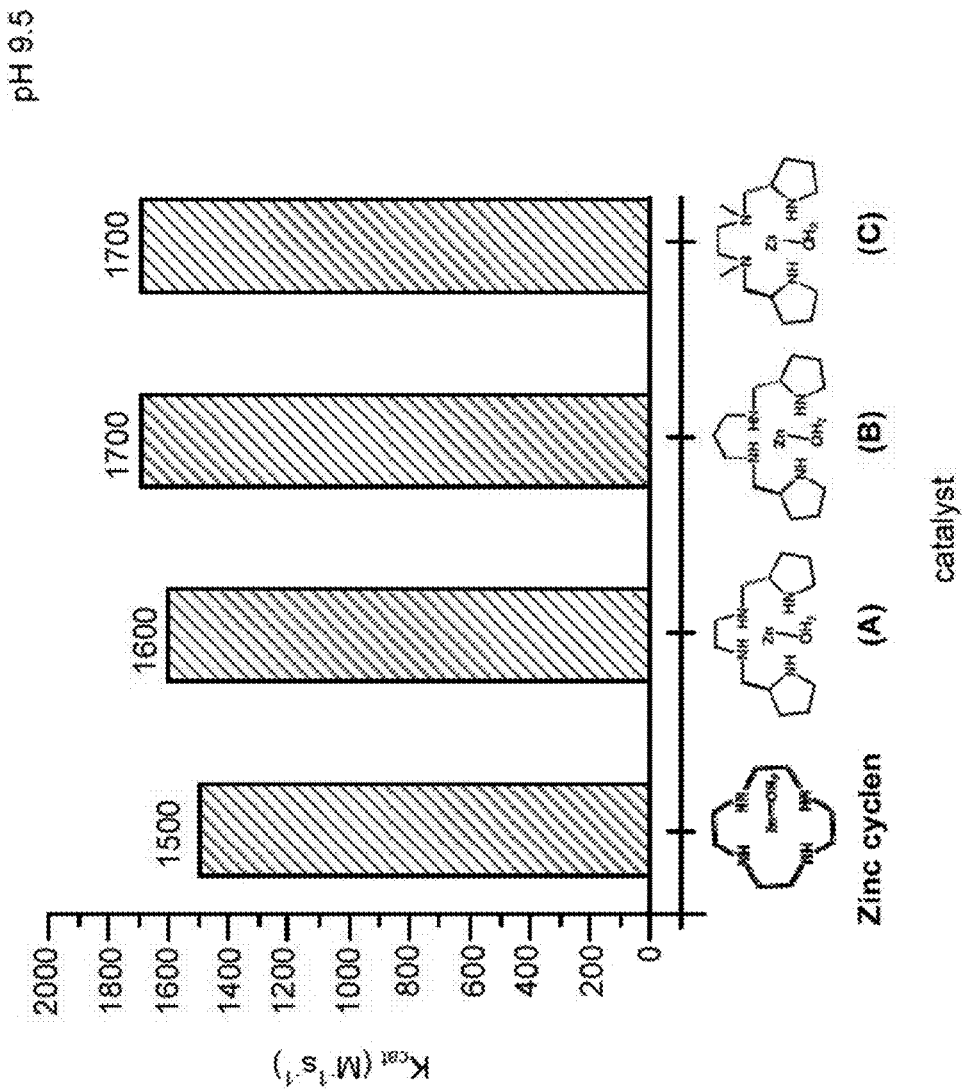
FIG. 8 shows a chart of the catalytic activity (measured using stopped-flow spectrophotometry) of several catalysts for catalyzing the conversion of $CO_2$ into bicarbonate at 25° C. and a pH of 9.5.

Based on the results of stopped-flow spectrophotometry measurements, such as those described above, a comparison was made with regard to the catalytic rate constants for the $CO_2$ hydration reaction for the various catalysts disclosed herein versus zinc cyclen (see e.g. FIGS. 8-11). For instance, FIG. 8 illustrates that the novel acyclic bis-pyrrolidinyl alkydiamine catalysts A-C each exhibit a higher catalytic rate constant for the $CO_2$ hydration reaction at a pH of 9.0 and 25°

C. as compared to the zinc cyclen catalyst. In particular, as shown in FIG. 8, the catalysts A-C catalyze the conversion of $CO_2$ into bicarbonate with a rate constant that is about 10% higher than that of zinc cyclen under otherwise identical conditions. These results were both unexpected and surprising.

Figure 9:
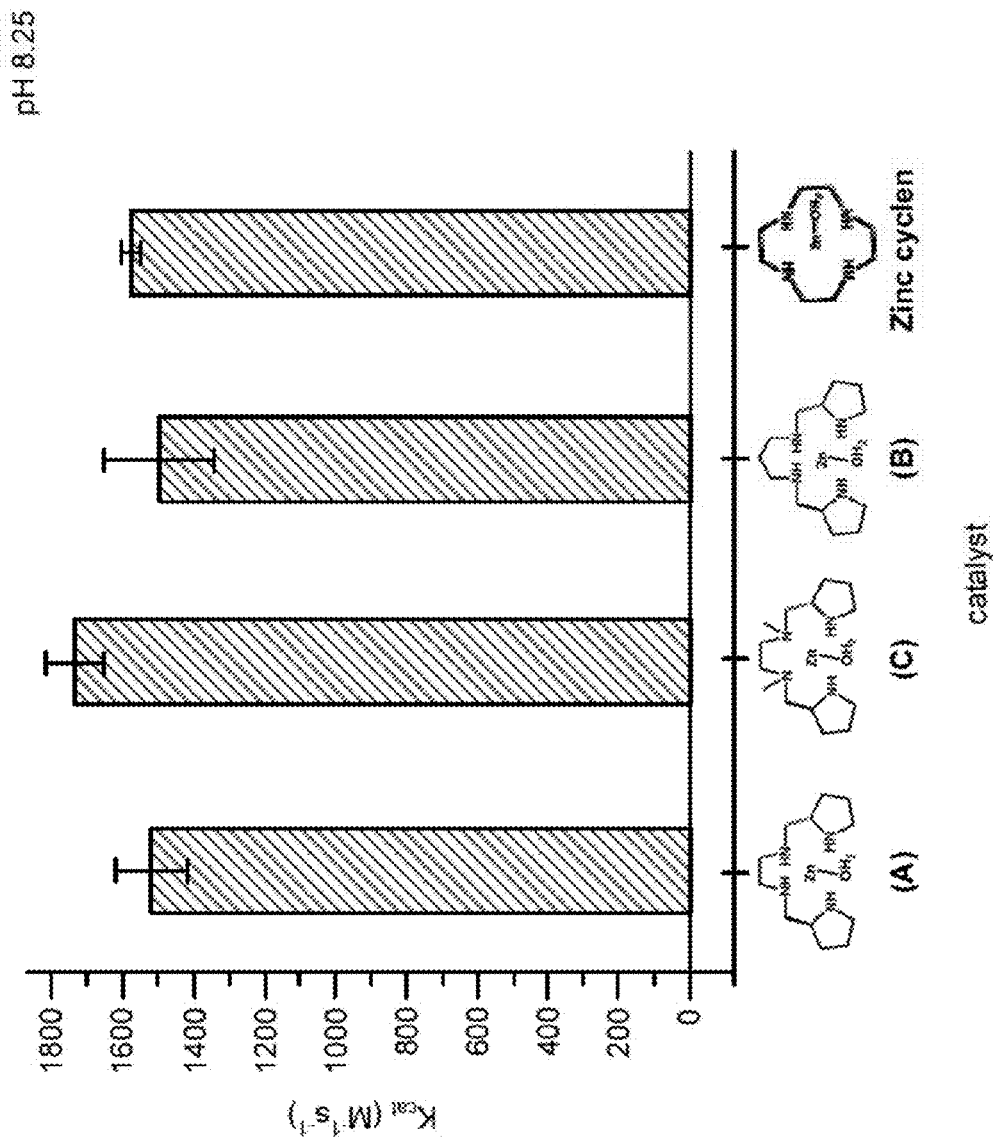
FIG. 9 shows a chart of the catalytic activity (measured using stopped-flow spectrophotometry) of several catalysts for catalyzing the conversion of $CO_2$ into bicarbonate at 25° C. and a pH of 8.25.

Moreover, as shown in FIG. 9, catalysts A-C each exhibit a catalytic rate constant for the $CO_2$ hydration reaction at a pH of 8.25 and 25° C. that is about equal to, slightly lower, or higher than that of zinc cyclen. Of note is catalyst C, whose catalytic rate constant for the $CO_2$ hydration reaction at a pH of 8.26 and 25° C. is still higher than that of zinc cyclen. The pKa of zinc cyclen is 8.0, while the pKa of catalysts A, B and C is about 8.3, 8.3 and 8.0, respectively. It is believed that the lower pKa of catalyst C may correlate with its higher catalytic activity at a pH of 8.25.

Figure 10:
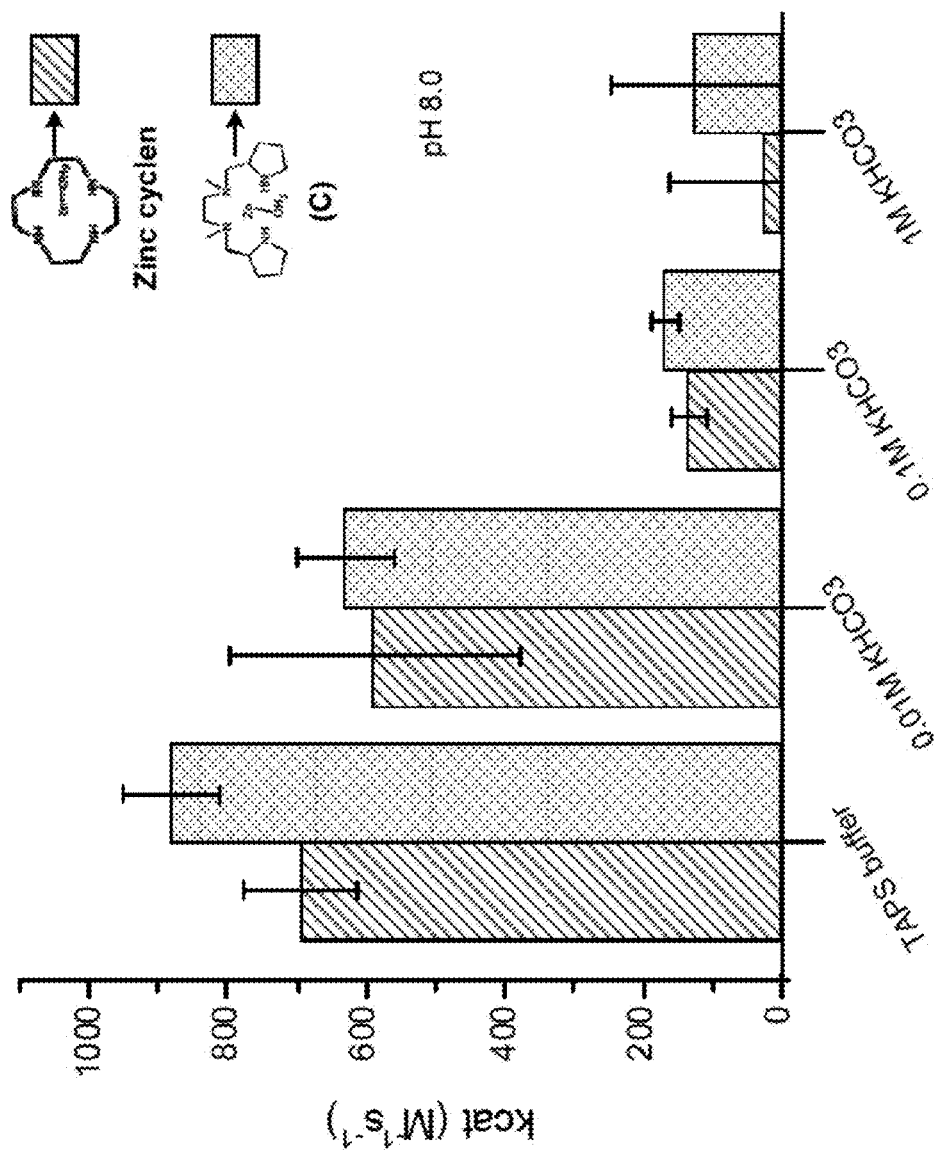
FIG. 10 shows a chart of the catalytic activity (measured using stopped-flow spectrophotometry) of several catalysts in varying bicarbonate concentrations for catalyzing the conversion of $CO_2$ into bicarbonate.

As shown in FIG. 10, catalyst C exhibits better catalytic activity as compared to zinc cyclen for the $CO_2$ hydration reaction in various bicarbonate concentrations.

Figure 11:
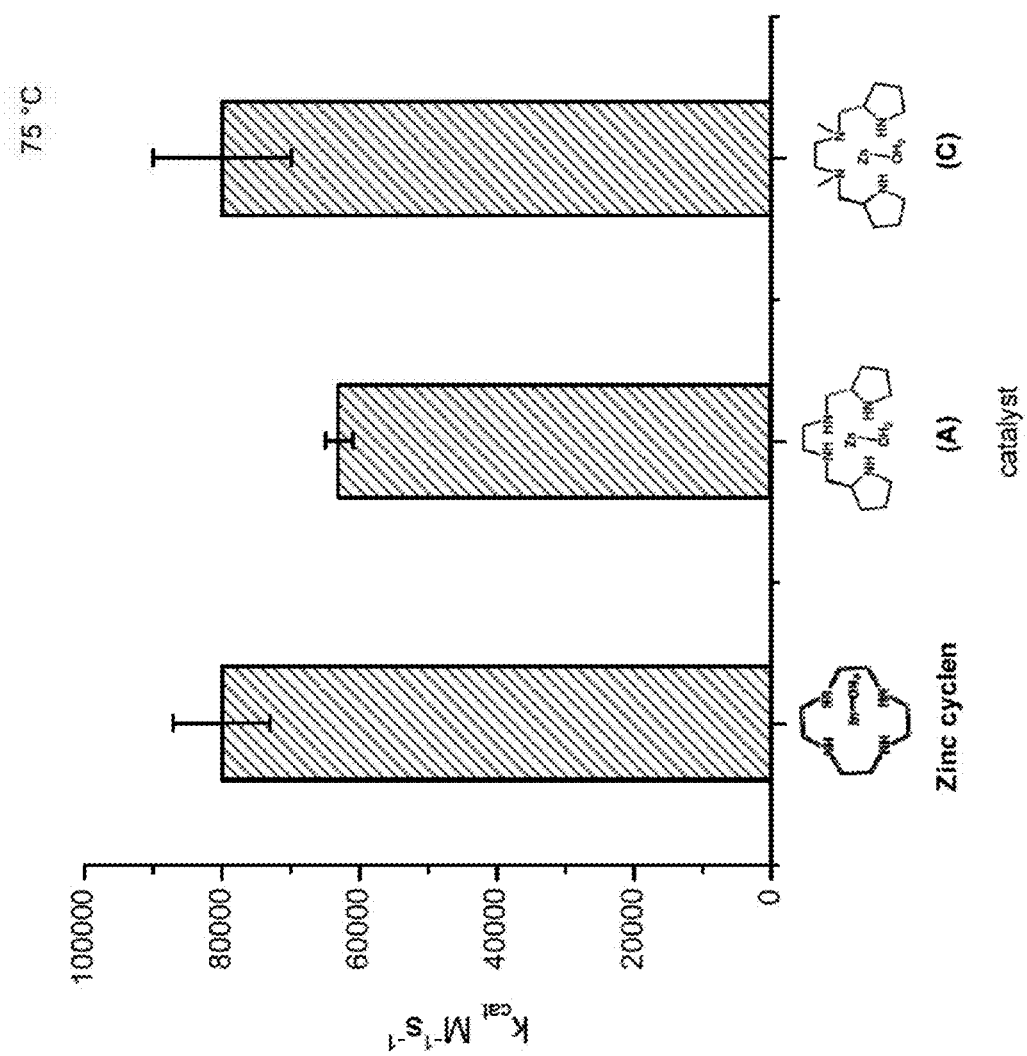
FIG. 11 shows a chart of the catalytic activity (measured using stopped-flow spectrophotometry) of several catalysts for catalyzing the conversion of $CO_2$ into bicarbonate at 75° C.

FIG. 11 shows the catalytic activity of catalysts A and C as compared to zinc cyclen for the $CO_2$ hydration reaction at 75° C.

Uses

According to various embodiments, many beneficial uses of the novel catalysts comprising a metal ion and acyclic ligands described herein may be derived. For example, in some approaches, these catalysts may be used in carbon capture systems to catalyze the conversion of $CO_2$ to bicarbonate. In other approaches, these catalysts may also be used to depolymerize amorphous silica. In more approaches, the catalyst may additionally be used hydrolyze ester compounds including but not limited to carboxy-ester, phosphor-ester, etc. It is important to note these uses are provided by way of example only and are not limiting in any way.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A catalyst, comprising:
    a metal ion; and
    an acyclic ligand having at least one aza-containing moiety and at least one m-membered heterocyclic amine moiety, wherein m is from 3 to 6,
    wherein the ligand is complexed to the metal ion.

2. A catalyst, comprising:
    a metal ion; and
    an acyclic ligand having at least one aza-containing moiety,
    wherein the ligand is complexed to the metal ion,
    wherein the metal ion is a zinc ion.

3. The catalyst of claim 1, wherein the metal ion is an ion of a metal selected from a group consisting of: Zn, Cu, Co and Ni.

4. A catalyst, comprising:
    a metal ion; and
    an acyclic ligand having at least one aza-containing moiety,
    wherein the ligand is complexed to the metal ion,
    wherein the acyclic ligand has the formula

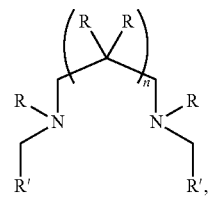

wherein a is 0 to 1,
wherein each R group independently comprises a moiety selected from the group consisting of a hydrogen and a $C_{1-10}$ alkyl,
wherein each R' group independently comprises a heterocyclic moiety, wherein at least one of the R' groups comprises a heterocyclic amine moiety.

5. The catalyst of claim 4, wherein at least one of the R groups is a methyl.

6. The catalyst of claim 4, wherein at least one R' groups is an m-membered heterocyclic amine moiety, wherein m is from 3 to 6.

7. The catalyst of claim 4, wherein at least one of the R' groups is a heteroaromatic moiety.

8. The catalyst of claim 7, wherein the heteroaromatic moiety is selected from a group consisting of: a pyrrole, a pyrroline, an imidazole, a thiazole, an oxazole, and a triazole.

9. The catalyst of claim 1, wherein the catalyst exhibits a catalytic activity for conversion of $CO_2$ into bicarbonate about equal to or greater than a zinc cyclen catalyst.

10. The catalyst of claim 4, wherein the system exhibits a catalytic activity for conversion of $CO_2$ into bicarbonate greater than a zinc cyclen catalyst under otherwise identical conditions.

11. The catalyst of claim 4, wherein the catalyst exhibits a catalytic activity of about 80,000 $mol^{-1}$ $s^{-1}$ for the conversion of $CO_2$ into bicarbonate at about 75° C.

12. The catalyst of claim 1, wherein the catalyst is characterized as exhibiting a greater catalytic activity in hydration of $CO_2$ than a zinc cyclen catalyst having a formula:

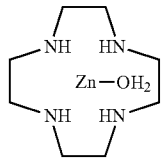

under otherwise identical conditions.

13. A method of making the catalyst of claim 1, comprising:
    providing a first compound having at least two amine moieties;
    providing a second compound having a carbonyl moiety;
    reacting the first and second compound to form a third compound;
    reducing carbonyl groups present in the third compound to form the ligand; and
    coupling the metal ion to the ligand.

14. The method of claim 13, wherein the first compound has the formula

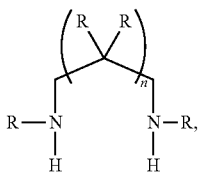

wherein n is 0 or 1, and wherein R independently comprises a moiety selected from the group consisting of a hydrogen and a $C_{1-10}$ alkyl.

15. The method of claim 13, wherein the second compound has the formula

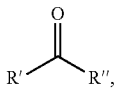

wherein R' is a heterocyclic amine moiety and R" is H or OH.

16. A method of depolymerizing amorphous silica, comprising using the catalyst of claim 1.

17. A method of hydrolyzing ester compounds using the catalyst of claim 1.

18. A method for capturing $CO_2$, comprising:

contacting the catalyst of claim 1 with a gas comprising $CO_2$ to at least partially remove $CO_2$ from the gas.

19. The method of claim 18, further comprising liberating the $CO_2$ after the contacting, wherein the liberating comprises heating the catalyst.

20. The catalyst of claim 1, wherein the heterocyclic amine moiety is a heteroaromatic moiety.

* * * * *